(12) United States Patent
Wahler

(10) Patent No.: US 11,875,208 B2
(45) Date of Patent: Jan. 16, 2024

(54) OMNIDIRECTIONAL MAGNETIC SURFACE FOR TRANSACTION CARDS

(71) Applicant: Adam Wahler, Westport, CT (US)

(72) Inventor: Adam Wahler, Westport, CT (US)

( * ) Notice: Subject to any disclaimer, the term of this patent is extended or adjusted under 35 U.S.C. 154(b) by 0 days.

(21) Appl. No.: 18/158,540

(22) Filed: Jan. 24, 2023

(65) Prior Publication Data
US 2023/0237299 A1 Jul. 27, 2023

Related U.S. Application Data

(60) Provisional application No. 63/302,461, filed on Jan. 24, 2022.

(51) Int. Cl.
*G06K 19/06* (2006.01)
*G06K 19/077* (2006.01)
*G06K 19/07* (2006.01)

(52) U.S. Cl.
CPC ... *G06K 19/06196* (2013.01); *G06K 19/0723* (2013.01); *G06K 19/07722* (2013.01)

(58) Field of Classification Search
CPC ......... G06K 19/06196; G06K 19/0723; G06K 19/07722
USPC .................................................. 235/493, 492
See application file for complete search history.

(56) References Cited

U.S. PATENT DOCUMENTS

| | | | | |
|---|---|---|---|---|
| 4,626,669 A * | 12/1986 | Davis | ...... | G07F 7/125 283/70 |
| 8,397,998 B1 * | 3/2013 | Mann | ...... | G06K 7/084 235/487 |
| 8,579,203 B1 * | 11/2013 | Lambeth | ...... | G07F 7/0806 235/487 |
| 9,858,517 B2 * | 1/2018 | Reed | ...... | G06K 19/022 |
| 2004/0217178 A1 * | 11/2004 | Lasch | ...... | G06K 19/07728 235/488 |
| 2007/0089831 A1 * | 4/2007 | Florentino | ...... | B32B 27/30 156/272.4 |
| 2008/0035738 A1 * | 2/2008 | Mullen | ...... | G07F 7/12 235/492 |
| 2008/0245865 A1 * | 10/2008 | Mosteller | ...... | B42D 25/00 235/457 |
| 2009/0294543 A1 * | 12/2009 | Varga | ...... | G06K 19/06196 235/492 |
| 2010/0264227 A1 * | 10/2010 | Joyce | ...... | G06K 19/077 235/487 |
| 2013/0087622 A1 * | 4/2013 | Collins | ...... | B42D 25/382 977/773 |
| 2013/0248607 A1 * | 9/2013 | Zlotnik | ...... | B42D 25/00 156/60 |
| 2017/0185885 A1 * | 6/2017 | Skelding | ...... | G06Q 20/341 |

(Continued)

*Primary Examiner* — Allyson N Trail
(74) *Attorney, Agent, or Firm* — Kim and Lahey Law Firm, LLC; Douglas W. Kim

(57) ABSTRACT

This assembly is directed to an encoded card that can be used for transactions, identifications, access controls and the like. The assembly can include a core having a first surface and a second surface (e.g., front and back), content disposed on the first surface or second surface taken from the group consisting of issuing institution, holder name, account number, expiration date, security information and other content and any combination thereof; a magnetic layer affixed to the second layer wherein the magnetic layer covers the majority of the second surface; and one or more areas defined in the magnetic area encoded with data that can be consistent with ISO standard 7813.

20 Claims, 4 Drawing Sheets

(56) References Cited

U.S. PATENT DOCUMENTS

| | | | |
|---|---|---|---|
| 2019/0198683 A1* | 6/2019 | Edwards | H01L 31/02008 |
| 2020/0364527 A1* | 11/2020 | Coleman | G06K 19/063 |
| 2022/0391867 A1* | 12/2022 | Glaser | G06F 3/017 |
| 2022/0414406 A1* | 12/2022 | Finn | G06K 19/0723 |
| 2023/0053541 A1* | 2/2023 | Yeh | G06K 19/07771 |
| 2023/0137393 A1* | 5/2023 | Lotya | G06K 19/07794 |
| | | | 29/850 |
| 2023/0281420 A1* | 9/2023 | Ormiston | G06K 19/044 |
| | | | 235/487 |
| 2023/0334281 A1* | 10/2023 | Finn | G06K 19/07794 |

\* cited by examiner

OMNIDIRECTIONAL MAGNETIC SURFACE FOR TRANSACTION CARDS

RELATED PATENT APPLICATIONS

This is a non-provisional patent application from U.S. Patent Application 63/302,461 filed Jan. 24, 2022 and incorporated by reference.

BACKGROUND OF THE INVENTION

1) Field of the Invention

This invention is directed to transaction cards, such a credit card, debit card, identification card, access card and the like, having a magnetic layer with a low coercivity and adapted to store and provide identification data to a reader.

2) Description of the Related Art

In recent history, magnetic tape was affixed to an identification card by melting a magnetic stripe on to the case. This is believed to be the origination of the magnetic stripe of the modern financial and identification card. As stated in U.S. Pat. No. 9,360,536, magnetic stripe cards have been in use since the 1960s. From its origination, the methods, devices, formats, and processes for storing and reading information from magnetic stripes has been standardized including International Organization for Standardization (ISO) standards, ISO-4909, ISO-7810, ISO-7811, ISO-7812, ISO-7813, and ISO-8583. Further, a magnetic stripe has been used on paper tickets for subways and then on other items such airline tickets. The benefit of magnetic information is that the magnetic stripe can be encoded with information that can be read by a magstripe reader. Generally, a magnetic stripe reader, also called a magstripe reader, is hardware configured to read information encoded in the magnetic stripe located on the back of a card. Magstripe readers can be in communication with computer devices, through such connections as a serial port, USB connection, wireless, input connection (e.g., keyboard, mouse, or stand-alone device). Computer readable instructions can interpret the information from the magnetic stripe, associate the information with other data and perform actions accordingly. Magnetic stripe store data as a pattern of positive and negative magnetic stripe fields. When the stripe is read, that pattern is decoded, and the information translated into a usable format.

Typically, the magnetic stripe contains one or more magnetic tracks (usually three) that are used to store data associated with the card. The card is usually presented to the magstripe reader by swiping or inserting it into the reader, which obtains the code using a magnetic head in the reader that is adapted to detect the magnetic field generated by its strip. Typically, there are insertion readers that require that the card be inserted into the reader and then removed and swipe readers that require the card pass completely through the reader.

An example of a reader and use of the reader and card is shown in U.S. Pat. No. 3,685,690. In this example, a currency dispenser can deliver cash to a user in response to a credit card having a magnetic stripe being presented to the machine. The magnetic stripe is coded to provide information to the machine. The coded credit card is presented to the currency dispenser and an initial check is made to determine if the card has the proper format. After checking the credit card format, coded information thereon is evaluated to check the user's identity prior to authorizing cash being dispensed from the machine.

Typically, the magnetic stripe is on the back of a card and is composed of iron-based magnetic particles encased in plastic-like tape. Each magnetic particle in the stripe is a tiny bar magnet about 20-millionths of an inch long. When all the bar magnets are polarized in the same direction, the magnetic stripe is blank. Information is written on the stripe by magnetizing the tiny bars in either a north or south pole direction with a special electromagnetic writer, called an encoder. The writing process, called flux reversal, causes a change in the magnetic field that can be detected by the magnetic stripe reader. Since there can be two different flux reversals, N-N or S-S, there can be two different information states as in the binary system used by computers. The magnetic stripe reader reads the information by detecting the changes in the magnetic field caused by the flux reversals on the badge's magnetic stripe.

Overtime there has been developed a standard for cards that determine the physical dimension and properties of the card to facilitate transactions between entities. For example, in the financial industry, the card is to be 2.125 inches in width, 3.375 inches in length and 0.030 inches in thickness. The stop of the magnetic stripe is to be 0.223 inches from one edge and the magnetic stripe is to be 0.110 inches in height and run the length of the card. Track 1 is to have 210 bits per inch, track 2 is to have 75 bits per inch and track 3 is to have 210 bits per inch. Track 1 is to have 7 bits per character and tracks 2 and 3 are to have 5 bits per character. Track 1 is to have 79 alphanumeric characters, track 2 is to have 40 characters and track 3 is to have 107 characters. A signature panel is typically disposed under the magnetic stripe and the credit card number is disposed under the signature panel. The credit card number can be in the front or back of the card.

Recently, metal financial cards have gained popularity due to the perceived status associated with a metal card and even glass cards which can provide physical properties such as heaver weight, audible reaction with surfaces, tactile qualities and association with high-value services, financial success, and social success. For such cards, there is a benefit for the cards to have high quality aesthetics. A disadvantage of the magnetic stripe is that it creates a break in the look and feel of the card, especially true for a glass substrate. The front or back of the card cannot be a flush singular color or surface as the magnetic stripe color, even colored stripes, does not match the surface of the card. In an obvious example, a clear contactless card shown in U.S. Pat. No. 7,306,158 shows the magnetic stripe interfering with the aesthetic aspects of the card. In this reference, the magnetic stripe is affixed to a transparent or translucent card (e.g., glass or plastic). It would be advantageous to have the feature and functionality of a magnetic stripe without detracting from the look and feel of the card.

Another development in the industry is to limit the number of magnetic stripes to one that is disposed on one edge of the card. As shown above, the magnetic strip must be placed in a specific position so that the tracks are in a specific position allowing the reader to know where the information is stored. This causes the use to know where the stripe is located and to swipe or insert the card in the proper orientation. Even when two magnetic stripes are used, the user is still required to know what orientation to use when the card is swiped or inserted. U.S. Pat. No. 7,954,708 shows a card with two magnetic stripes. However, each stripe activates a different feature of the card so that the orientation of the card during swiping and inserting is critical. For example, this reference states that each magnetic strip is programmed with a code corresponding to a particular feature of the card and an authorization code. Further, the use of two magnetic stripes further detracts from the aesthetic features of the card in that the surface of card wither has a magnetic stripe on the front and back or two magnetic stripes on the front of the back.

While there have been attempts to improve information stored and transmitted from a card, see U.S. Pat. No. 5,828,044, the need for magnetic such as stored on a magnetic stripe is still needed. One disadvantage of traditional magnetic striped cards is that when made from PVC plastics, are designed to last for three years or less. While some cards have a longer anticipated life span, they are made from PET, PET/PVC hybrid, and polycarbonate. Coating can be used, but the harder coatings are, the less ability there is for hot stamps and applying content such as signature panels to the cards.

Therefore, it is an object of the present invention to have a card with magnetically encoded information while providing an aesthetic look and feel.

It is another object of the present invention to provide a card allowing for providing information from a magnetic medium omnidirectionally.

It is another object of the present invention to provide a card allowing for an aesthetic look and feel which includes magnetic media.

BRIEF SUMMARY OF THE INVENTION

The above objectives are accomplished by providing a transaction card comprising a core having a first surface and a second surface; a set of content disposed on the first taken from the group consisting of issuing institution, holder name, account number, expiration date, security information and any combination thereof; a magnetic layer affixed to the second layer wherein the magnetic layer covers at least 90 percent of the first surface; a first area defined in the magnetic area encoded with data wherein the first area is consistent with ISO standard 7813; a top area defined in the magnetic area the is unencoded; and, a middle area defined in the magnetic are that is unencoded. The core can be a metal core, PVC, bioplastic (or other biodegradable material), polymer, or other material. The content can be disposed on the core by a method taken from the group of etching, painting, printing, or any combination thereof.

A first protective layer can be affixed to the first surface and the second protective layer affixed to the magnetic layer. The magnetic layer can be affixed to the core using an adhesive that can be pressure or heat activated. The card can include a non-contact chip disposed in or between one or more layers and an antenna disposed in or between one or more layers wherein the non-contact chip and antenna can be in electronic communications with the non-contact chip.

Encoding the first area can use a method consistent with any one of ISO 7811-1 through ISO 7811-9. The transaction card can include a third area defined in the magnetic layer where the third area is orthogonal to the first area. The data on the third area does not need to overlap with the first area. The data encoded on the magnetic layer can be outside the first area. A color layer can be carried by the core. A content layer can be carried by the core.

The transaction card can include a core having a front surface and a second surface wherein the core is a metal; a magnetic layer affixed to the second surface wherein the magnetic layer covers at least 50 percent of the second surface; and a first area defined in the magnetic area encoded with data adapted to be read by a magstripe reader. The magnetic layer can cover substantially all of the second surface.

The transaction card can include a core having a front surface and a rear surface wherein the core is a metal; a magnetic layer affixed to the second surface wherein the magnetic layer has an area equal to an area of the second surface; and a first area defined in the magnetic area consistent with ISO 7811. The first area can include a first track disposed in the range of 0.26 inches to 0.29 inches form a top edge of the core. The first area can include a second track that can be disposed in the range of 0.350 inches to 0.450 inches form a top edge of the core. The transaction card can include a second track that can be disposed in the range of 0.450 inches to 0.600 inches form a top edge of the core.

The transaction card can include a core having a front surface and a second surface wherein the core is a glass or include one or more layers that is a glass.

The surface of the card can be matte, gloss or any combination.

BRIEF DESCRIPTION THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

With reference to the drawings, the invention will now be described in more detail.

Figure 1:
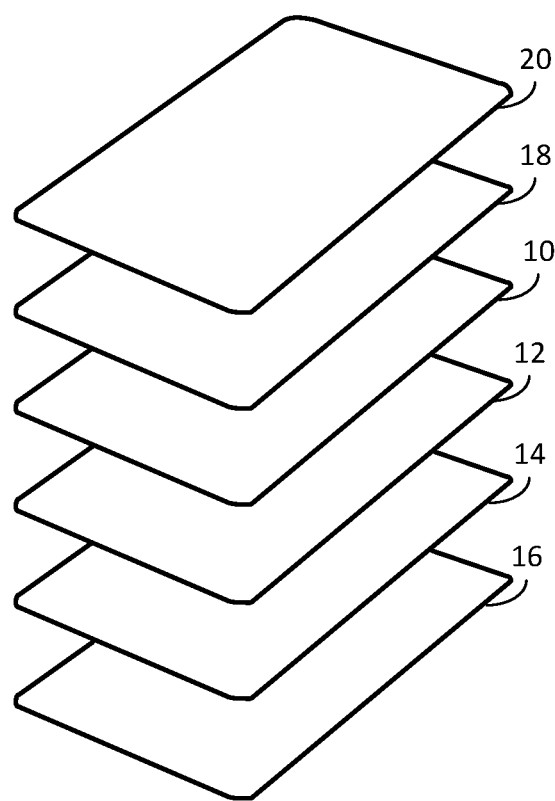
FIG. 1 is a perspective view of various layers of an exemplary card.

Referring to FIG. 1, the card can include a metal layer 10. The core can then have an adhesive layer 12 which can be pressure, chemically or heat activated. The adhesive layer can be used for affixing a magnetic layer 14 to one side of the core. The magnetic layer can extend to the edges of the core. A rear protective layer 16 can be affixed to the magnetic layer and can be opaque or transparent. The rear protective layer can be colored as well. A colored layer 18 can be affixed to the magnetic layer, carried by the magnetic layer, or affixed or carried by a side opposite the magnetic layer on the core. A top protective layer 20 can be affixed or carried by the core and can be colored, opaque, transparent and any combination. The colored layer can have one area colored, one area opaque, one area transparent or any combination. In one embodiment, one or more of the layers can be transparent and can be made from metal, glass, plastic, polymer or any combination.

Figure 2:
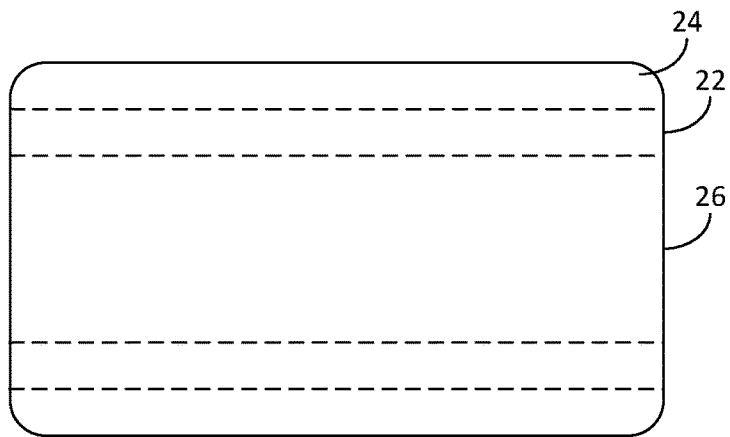
FIG. 2 is an elevation view of one side of an exemplary card with the magnetic layer.

Referring to FIG. 2, the magnetic layer is shown. The magnetic layer can be encoded so that a first area 22 of the magnetic layer can be encoded with information consistent with one or more of the tracks commonly used including three tracks. The magnetic layer can include an edge area 24, that while made from a magnetic medium, does not have data encoded in this area. The magnetic layer can include a middle area 26 that, while having a magnetic medium, can be devoid of encoded information. Therefore, a card can be provided that include the tracks of the traditional magnetic stripe, but includes a magnetic medium extending from each edge of the card. When swiped, the magstripe reader reads area 22 which functions as a traditional magnetic stripe but does not have the surface discontinuity that is present with the traditional magnetic stripe.

Figure 3:
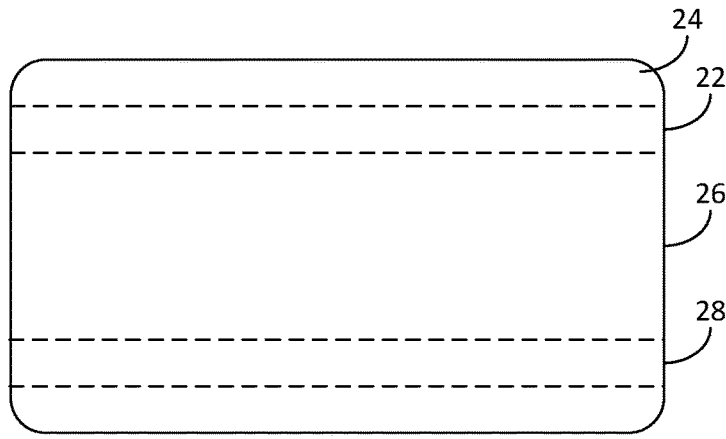
FIG. 3 is an elevation view of one side of an exemplary card with the magnetic layer.

Referring to FIG. 3, the magnetic layer is shown with a second magnetic area 28. This second magnetic area is the same distance from the lower edge as the first area is from the upper edge. Typically, when the card is swiped, the user needs to align the magnetic stripe so that the edge of the card with the magnetic stripe is received into a slot of the magstripe reader. The present magnetic layer includes the first and second areas so that the user does not need to properly orient the card. With some magstripe readers, the direction of the swipe is restricted. The first area can be encoded to have information read in the first direction and the second area encoded so that information can be read in a second direction. Therefore, the first area or the second area can be used without having to change direction according to which area be being read. In another embodiment, the first area is encoded in a first direction and the second area is encoded in a second direction wherein the first direction and the second direction are in the same direction. In one embodiment the first area can include one or more tracks and the second area can include one or more tracks wherein the first area has a different track than the second area. For example, the first area can include a first track and the second area can include a second and/or third track.

Figure 4:
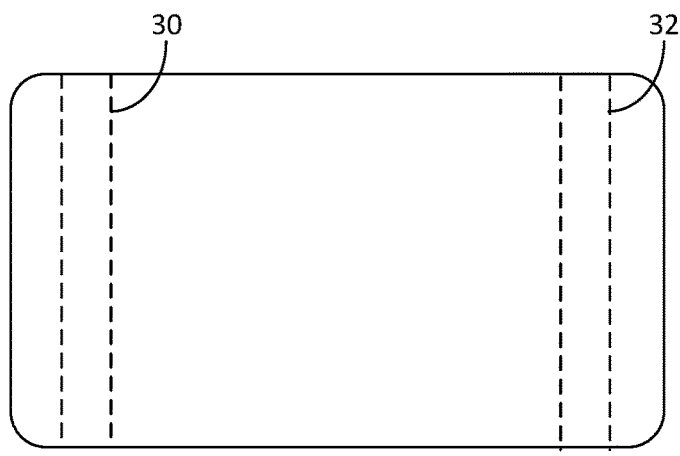
FIG. 4 is an elevation view of one side of an exemplary card with the magnetic layer.

Referring to FIG. 4, the magnetic layer can include a third magnetic area 30 and a fourth magnetic area 32 that can run width wise relative to the card and can be disposed the same distance from the short edge of the card as the first and second areas. Therefore, the short edge of the card can be swiped or inserted into a magstripe reader and the third and fourth area provide information to the reader. In one embodiment, a first magnetic layer is on one side of the core having the first area and a second magnetic layer is on opposite of the card and includes the second area. In one embodiment, the first area and the second area are on one side of the core defined in a first magnetic layer and the third and fourth areas are on the other side of the core defined in a second magnetic layer affixed the opposite side of the core. In one embodiment, a data start information and data stop information can be included in the third and fourth area so that the data of the first and second area is distinct from the third and fourth area. The third a fourth care can have information encoded in these areas. The information can differ from area to area and track to track.

Figure 5:
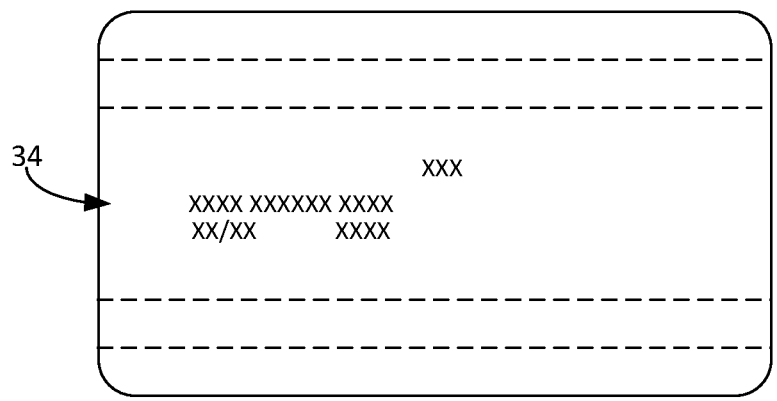
FIG. 5 is an elevation view of one side of an exemplary card with the magnetic layer.

Referring to FIG. 5, the core is metal and alpha numeric, graphics, or other content 34 can be contained on a side opposite the magnetic layer. Information that can be continued on the side opposite the magnetic layer can include the issuing entity such as a bank or other financial institution, card number, card holder name, expiration date, branding information, background image, security information such as a CCV/CVC/CVS/CVV and any combination. The content can be laser etched into the core, printed, or painted onto the core or can be etched, painted, drop-on-demand, laser cut, embossed, coasted, stamped, or printed on a color or other layer that can be affixed to the core. The core or other layer can be painted and then etched or printed. A transparent protective layer can be applied to the core. The magnetic layer can be on one side of the core and the content can be disposed on the opposite side of the core. The magnetic layer can also have content disposed on it as well.

Figure 6:
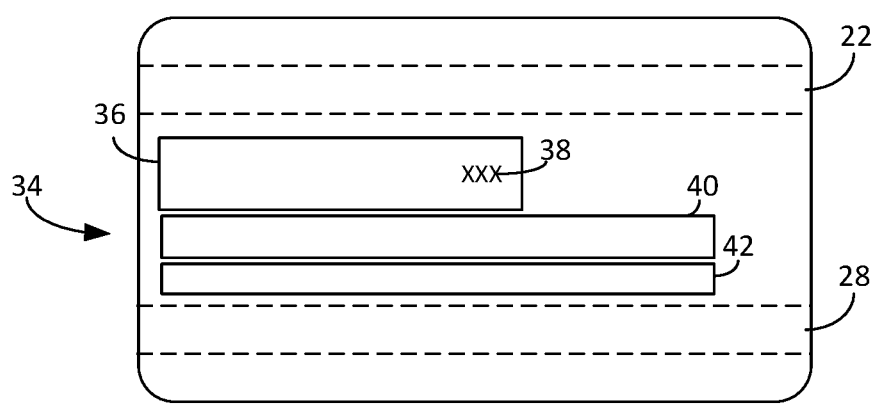
FIG. 6 is an elevation view of one side of an exemplary card.

Referring to FIG. 6, a content layer can be affixed over the magnetic layer where in the content layer allows for content 34 to be etched, painted, printed, or otherwise placed on the content layer. The content can include a signature panel 36, security information 38, account number 40 and expiration information 42. The content can be disposed around or over the first area 22 and second area 28.

Figure 7:
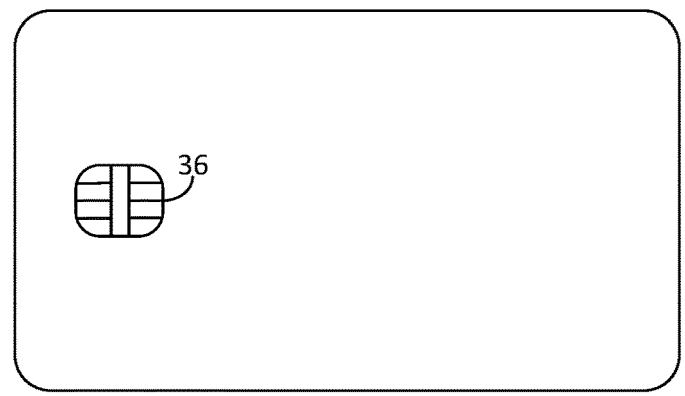
FIG. 7 is an elevation view of one side of an exemplary card non-contract chip.
Figure 8:
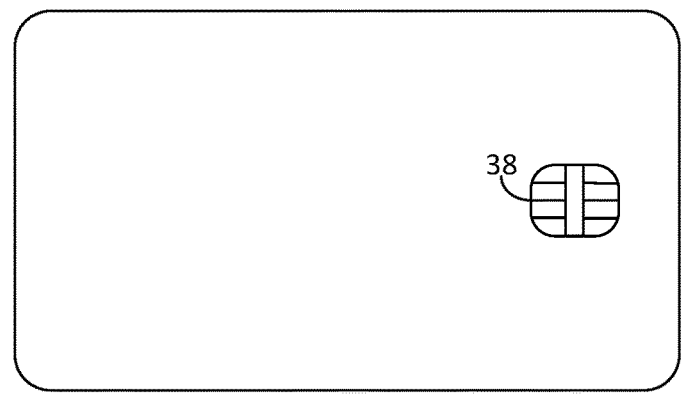
FIG. 8 is an elevation view of one side of an exemplary card with a non-contact chip.

Referring to FIG. 7, one or more of the layers can include a void for receiving a non-contact chip 36 such as a EMV chip or RF chip wherein the non-contact chip can transmit information wirelessly from the card. The non-contact chip can also be disposed between one or more layers. An antenna (not shown) can also be disposed in or between one or more layers, the antenna can be linear, coiled, sawtoothed, symmetrical, undulating, zigzag, serpentine, and any combination thereof. The magnetic layer can be of a low coercivity adapted not to be affected by a non-contact chip or antenna. The non-contact chip can be disposed on either side of the card.

The magnetic layer, covering generally the entire surface of one side of the core, provide for a smooth single-color surface resulting in an aesthetically pleasing card. The discontinuity of the traditional magnetic stripe is removed. The magnetic layer can be affixed to a metal core to provide an aesthetically and tactile pleasing metal card, which is desirable among consumers. Any area of the magnetic area can be encoded so that the information that is provided by this card is not limited to the traditional magnetic stripe. Because the information on the magnetic layer can be positioned in the location of the traditional magnetic stripe, existing magstripe readers can be used.

Figure 9:
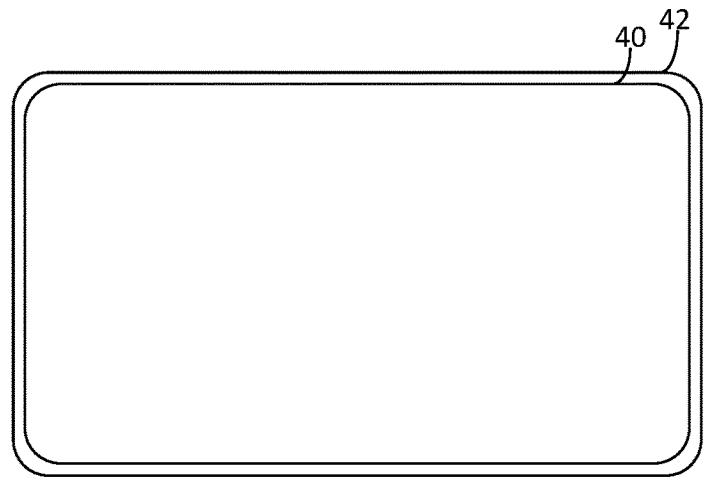
FIG. 9 is an elevation view of one side of an exemplary card showing a core and frame.

Referring to FIG. 9, one embodiment is shown where in the core 40 can be glass such as aluminosilicate, sapphire, tempered, and the like and can be transparent or semitransparent. The core can have a high transformative temperature, hardness, and scratch resistance so that a protective layer need not be used. The edges of the core, and other layers, can be reinformed with a frame 42 that can be a metal, plastic, or other suitable materials.

By having a magnetic layer that extends to the edges of the core, information can be encoded on the magnetic as opposed to the prior art that requires a magnetic strip, thereby limiting the data that can be encoded on a card. Further, having a first area on one side of the card and a second area on the other side of the card allowed the information to be mirrored so that the card can be read (e.g., swiped) on either side without orienting in any magnetic swipe a certain way. Since the information can be encoded on the first area and the second area (e.g., FIGS. 2 and 3, elements 22 and 29) the card can be swiped on either side and the information mirrored.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A transaction card comprising:
   a core having a first surface and a second surface;
   a magnetic layer carried by the core and extending to a perimeter of the core;
   a first set of content disposed on the first surface taken from the group consisting of issuing institution, holder name, account number, expiration date, security information and any combination thereof;
   a second set of content disposed on the magnetic layer positioned away from the core and taken from the group consisting of card security code, card verification value, signature block, account number, expiration date, contact information and any combination thereof; and,
   a protective layer affixed to the magnetic layer.

2. The transaction card of claim 1 having a first area defined in the magnetic layer a distance from a first long edge of the core and a second area defined in the magnetic layer at the distance from a second long edge of the core.

3. The transaction card of claim 2 wherein the first area and the second area are encoded with the same data.

4. The transaction card of claim 3 wherein the first area and the second area are mirrored.

5. The transaction card of claim 2 including a top area defined in the magnetic layer above the first area that is unencoded.

6. The transaction card of claim 2 including a middle area defined in the magnetic layer that is unencoded.

7. The transaction card of claim 1 wherein a first area defined in the magnetic layer includes a first track disposed in a first range of 0.26 inches to 0.29 inches from a top edge of the core.

8. The transaction card of claim 7 wherein the first area includes a second track disposed in a second range of 0.350 inches to 0.450 inches from the top edge of the core.

9. The transaction card of claim 8 wherein the first area includes a third track disposed in a third range of 0.450 inches to 0.600 inches from the top edge of the core.

10. The transaction card of claim 1 having a first area defined in the magnetic layer encoded with data wherein the first area is consistent with ISO standard 7813.

11. The transaction card of claim 1 wherein the first set of content is disposed on the core by a method taken from the group consisting of etching, painting, printing, and any combination thereof.

12. The transaction card of claim 1 wherein encoding a first area uses a method consistent with any one of ISO 7811-1 through ISO 7811-9.

13. The transaction card of claim 1 wherein the protective layer is a first protective layer and a second protective layer is affixed to the core and away from the magnetic layer.

14. The transaction card of claim 1 wherein the magnetic layer is affixed to the core using an adhesive.

15. The transaction card of claim 14 wherein the adhesive is heat activated.

16. The transaction card of claim 1 including a non-contact chip disposed on the core and an opening defined in the magnetic layer adapted to expose the non-contact chip.

17. The transaction card of claim 1 including a color layer carried by the core.

18. A transaction card comprising:
    a core having a first surface and a second surface;
    a magnetic layer carried by the core and extending to a perimeter of the core;
    a first area defined in the magnetic layer a distance from a first short edge of the core;
    a second area defined in the magnetic layer at the distance from a second short edge of the core;
    a first set of content disposed on the first surface taken from the group consisting of issuing institution, holder name, account number, expiration date, security information and any combination thereof;
    a second set of content disposed on the magnetic layer positioned away from the core and taken from the group consisting of card security code, card verification value, signature block, account number, expiration date, contact information and any combination thereof; and,
    a protective layer affixed to the magnetic layer.

19. The transaction card of claim 18 wherein data is encoded on the magnetic layer outside the first area.

20. A transaction card comprising
    a core having a front surface and a rear surface;
    a magnetic layer affixed to the rear surface wherein the magnetic layer covers the rear surface;
    a first area defined in the magnetic layer encoded with data adapted to be read by a magstripe reader; and,
    a second area defined in the magnetic layer mirrored relative to the first area.

* * * * *